(12) United States Patent
Sakai et al.

(10) Patent No.: US 6,487,517 B2
(45) Date of Patent: Nov. 26, 2002

(54) TARGET FOR PHOTOGRAMMETRIC ANALYTICAL MEASUREMENT SYSTEM

(75) Inventors: Teruo Sakai, Saitama (JP); Atsumi Kaneko, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/862,616

(22) Filed: May 23, 2001

(65) Prior Publication Data

US 2001/0055483 A1 Dec. 27, 2001

(30) Foreign Application Priority Data

May 25, 2000 (JP) ....................................... 2000-154006

(51) Int. Cl.$^7$ .............................................. G06F 15/00
(52) U.S. Cl. ..................... 702/158; 250/201.7; 250/558
(58) Field of Search ............................ 382/154; 353/7; 352/208; 356/12; 348/148; 250/558, 201.7

(56) References Cited

U.S. PATENT DOCUMENTS

| | | | | |
|---|---|---|---|---|
| 3,783,294 A | * | 1/1974 | Koper | ........................ 250/558 |
| 4,526,439 A | * | 7/1985 | Okoshi et al. | ................. 353/7 |
| 4,536,069 A | * | 8/1985 | Kunica | ........................ 352/208 |
| 4,641,960 A | * | 2/1987 | Bozzolato | ..................... 356/12 |
| 4,965,442 A | * | 10/1990 | Girod et al. | ............. 250/201.7 |
| 5,517,419 A | * | 5/1996 | Lanckton et al. | ........... 348/148 |
| 6,144,761 A | * | 11/2000 | Kaneko et al. | ............. 382/154 |

* cited by examiner

*Primary Examiner*—John S. Hilten
*Assistant Examiner*—Aditya Bhat
(74) *Attorney, Agent, or Firm*—Greenblum & Bernstein, P.L.C.

(57) ABSTRACT

A control unit box and one of standard point members are provided close to a connection of first and second bars. A standard plane is defined by the standard point members. A loop antenna is provided in a mount unit situated on the top surface of the control unit box. The box is positioned such that a ratio of a second distance to a first distance is less than tan 8°. The first distance is from the point member to the mount unit, along the standard plane, and the second distance is from the standard plane to the top surface of the mount unit, along a direction perpendicular to the standard plane. The antenna is connected to an oscillator of 310 MHz. With respect to the antenna, the total length is approximately 0.48 m, a height from the top surface of the unit box is approximately 9.5 mm, and the inner diameter is approximately 25 mm.

7 Claims, 15 Drawing Sheets

FIG. 14

| | DIAMETER OF LOOP (mm) | TOTAL LENGTH (m) | CONDUCTOR COIL HEIGHT (mm) | COMM— UNICATION DISTANCE (m) |
|---|---|---|---|---|
| ① | 25 | 0.25 | 8.0 | 2.5~3.0 |
| ② | 25 | 0.35 | 8.0 | 5.5~6.0 |
| ③ | 25 | 0.40 | 8.0 | 7.0 |
| ④ | 25 | 0.48 | 9.5 | 8.5~10.0 |
| ⑤ | 30 | 0.24 | 8.0 | 1.5~2.0 |
| ⑥ | 30 | 0.35 | 8.0 | 6.0~7.0 |
| ⑦ | 30 | 0.47 | 8.0 | 7.0~7.5 |
| ⑧ | 35 | 0.40 | 8.0 | 7.0~7.5 |
| ⑨ | 35 | 0.50 | 8.0 | 7.0 |
| ⑩ | 35 | 0.60 | 8.0 | 6.0~6.5 |
| ⑪ | 35 | 0.70 | 8.0 | 6.0 |
| ⑫ | 35 | 0.80 | 8.0 | 6.0 |
| ⑬ | 35 | 0.94 | 8.0 | 7.0 |
| ⑭ | 40 | 0.47 | 4.0 | 2.5~3.5 |
| ⑮ | 40 | 0.47 | 8.0 | 5.0~6.0 |
| ⑯ | 40 | 0.47 | 10.0 | 5.0~6.0 |
| ⑰ | 40 | 0.94 | 8.0 | 7.0~8.0 |
| ⑱ | 50 | 0.47 | 8.0 | 5.0 |
| ⑲ | 50 | 0.94 | 8.0 | 1.5~2.5 |
| ⑳ | 60 | 0.90 | 8.0 | 4.5~5.0 | mm:millimeters, m:meters
DIAMETER OF LOOP:
  INNER DIAMETER OF WINDING OF CONDUCTOR
CONDUCTOR COIL HEIGHT:
  DISTANCE BETWEEN CONDUCTOR WINDING AND
  TOP SURFACE OF CONTROL UNIT BOX, ALONG
  A DIRECTION PERPENDICULAR TO TOP SURFACE

TARGET FOR PHOTOGRAMMETRIC ANALYTICAL MEASUREMENT SYSTEM

BACKGROUND OF THE INVENTION

1. Field of the Invention

This invention relates to a target for use in a photogrammetric analytical measurement system, in which a survey map is produced on the basis of a set of photographed pictures obtained at different photographing positions.

2. Description of the Related Art

For example, photogrammetry is carried out at a traffic accident spot. The traffic accident spot is photographed by a camera from at least two different positions, and a survey map of the traffic accident spot is produced, based on a set of photographed pictures obtained at the different positions. A target is placed in a photogrammetry spot, for example the above-mentioned traffic accident spot, in order to calculate positional data of the camera at which the pictures are photographed. The target includes three standard point members (indicating members). The three standard point members are made of a material of high luminance. Namely, an amount of incident light reflected from the material is increased to facilitate recognition of the standard point members in the photographed pictures.

The photogrammetry spot is photographed with the target by the camera at different positions and angles. The photographed images are converted to a plurality of digital image data which are stored in a memory of a computing system. A pair of digital image data are chosen from among the plurality of digital image data, and they are displayed on a monitor which is connected to the computing system.

A given measurement point is selected in one of the chosen pair of digital image data, and a corresponding measurement point is selected in another of the chosen pair of digital image data. The selection is carried out with a cursor by manipulating a mouse. This operation is repeatedly performed such that a plurality of pairs of measurement points are selected. A series of predetermined operations is carried out based on positional data of the above-mentioned standard points and the indicated measurement points, so that a survey map of the photogrammetry spot is produced.

Besides the positional data of the standard point members, data regarding positioning of the target is required for the predetermined operations, and therefore, the target for the above-mentioned photogrammetric analytical measurement system is provided with sensors, for example a tilt sensor, an azimuth sensor and so on. Information from these sensors is utilized to create the data regarding the position of the target. The data regarding the position of the target is transmitted to the camera during a photographing operation via an antenna which is provided in the target. After the data is received by the camera, the data is stored in a memory of a processor, which is included in the camera, with the photographed image data.

Usually, a predetermined distance exists between the target and the position of the camera, when the photogrammetry spot is photographed. Further, the target is situated on a surface of a road of the photogrammetry spot, and the camera is positioned at a predetermined height from the surface of the road. Accordingly, a rod antenna may be utilized to make the transmittance from the antenna to the camera highly sensitive.

However, as the rod antenna projects further than other components of the target, the rod antenna may be hit when it is carried, or may be kicked by mistake when it is set on the road. Namely, the rod antenna has a problem in that it is easy to be broken. Further, due to a positional relationship between the standard point members, the rod antenna and the position of the camera, the standard point members may be obstructed by the rod antenna, so that the standard point members may not be photographed. If the standard point members are not photographed, precise positional data of the standard point members can not be obtained, so that the above-mentioned operation for producing a survey map cannot be carried out.

SUMMARY OF THE INVENTION

Therefore, an object of the present invention is to provide a target for a photogrammetric analytical measurement system, including an antenna which transmits data to a camera reliably without obstructing any indicating members of the target.

In accordance with an aspect of the present invention, there is provided a target for photogrammetric analytic measurement comprising: a first bar and a second bar which are connected at adjacent end portions; indicating members that are able to be recognized in a photographed image by a camera, placed on the first and second bars to define an identical plane; a box in which sensors for detecting data utilized to calculate a photographing position of the camera, provided on the first bar or the second bar at a position close to the connecting end portion; a loop antenna that transmits the data detected by the sensors to an outer device; and a projecting portion in which the loop antenna is provided, being placed on the box, at a side at which the indicating members are placed, on the first and second bars. A relationship between a first distance and a second distance are defined by an expression to follow. The first distance is along the identical plane between a first indicating member of the indicating members, which is positioned close to the connecting end portion, and the projecting portion. The second distance is along a direction perpendicular to the identical plane between a top surface of the projecting portion and the identical plane. The expression is:

$$K2/K1 < \tan 8°$$

(herein, K1 is the first distance, K2 is the second distance)

Preferably, a total length of a conductor, which is wound to construct the loop antenna, is approximately half of a wavelength of a radio wave sent from the loop antenna. The inner diameter of the winding of the conductor is within a range between approximately 25 mm (millimeters) through 50 mm, and a distance, along the perpendicular direction, between the identical plane and the loop antenna is greater than or equal to approximately 8 mm.

Preferably, the projecting portion has a generally cylindrical configuration which is coaxial with a center axis of the loop antenna. The center axis exists on a bisector of the first indicating member and a second indicating member of the indicating members, which is placed on the first or second bar at which the box is provided, being adjacent to the first indicating member.

Optionally, the projecting portion comprises: a holding member that holds the loop antenna, being fixed on the top surface of the box; and a covering member that protects the loop antenna from the outer side.

Optionally, the projecting portion is fixed on the top surface of the box, being made of resin, and the loop antenna is molded in the projecting portion.

Preferably, the box is positioned at an area of a right angle or an acute angle made by the first and second bars.

As described above, according to the present invention, the data detected by the sensors is transmitted by the loop antenna. Accordingly, the size of the projecting portion in which the antenna is provided can be changed such that the projection above other components of the target, can be reduced. Further, the first indicating member is not obstructed by the antenna in a photographed image, by positioning the projecting portion on the box such that the first distance and the second distance satisfies the aforementioned expression.

Due to the reduction in size of the projecting portion, the projecting portion is prevented from being broken by carelessly hitting or kicking the projecting portion when the target is carried or set on a photogrammetric spot.

Further, according to the present invention, the total length of the conductor, which is wound to construct the loop antenna, is set to approximately half the a wavelength of a radio wave sent from the loop antenna, and the inner diameter of the conductor winding is set to a range between approximately 25 mm through 50 mm, and the distance, along the perpendicular direction, between the identical plane and the loop antenna is set to a value greater than or equal to approximately 8 mm. Therefore, a predetermined communication distance of the antenna can be obtained, so that data utilized for the photogrammetric analytic measurement can be reliably transmitted from the target to an outer device, for example a camera.

BRIEF DESCRIPTION OF THE DRAWINGS

The object and other objects of the present invention will be better understood from the following description, with reference to the accompanying drawings, in which:

FIG. 14 is a view showing a table in which a result of an experiment with respect to a relationship between parameters of a loop antenna, i.e., a diameter of loop, a total length, and a coil height, of a conductor of the loop antenna, and a communication distance;

DESCRIPTION OF THE PREFERRED EMBODIMENTS

Figure 1:
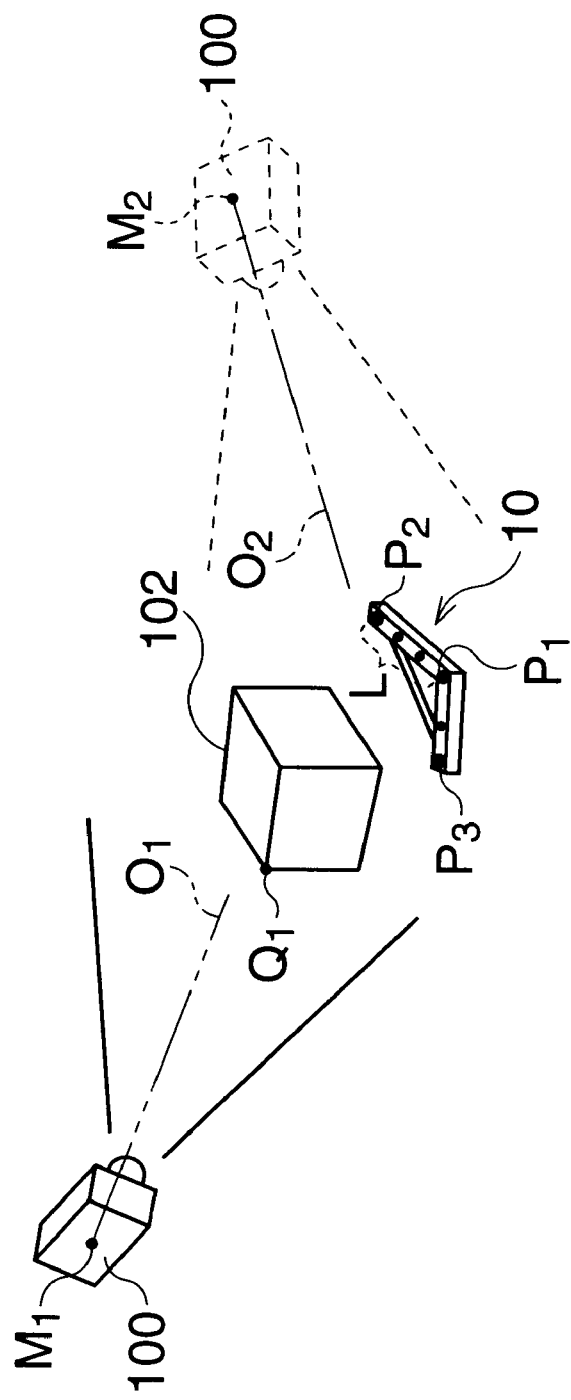
FIG. 1 is a conceptual perspective view showing a positional relationship between the target for the photogrammetric analytical measurement system according to the present invention, an object and a camera.

FIG. 1 conceptually shows a photogrammetric measurement system, using a target to which an embodiment, according to the present invention, is applied. In this drawing, a cubic object 102 is situated at a spot to be photogrammetrically measured, and a target 10 is placed beside the cubic object 102. The target 10 and the cubic object 102 are photographed from two different directions by the camera, indicated by reference 100. Namely, as shown in FIG. 1, the target 10 and the cubic object 102 are photographed by the camera 100 placed at a first photographing position $M_1$, shown by a solid line, and are then photographed by the camera 100 placed at a second photographing position $M_2$, shown by a broken line. At the first photographing position $M_1$, an optical axis of the camera 100 is indicated by reference $O_1$, and, at the second photographing position $M_2$, the optical axis of the camera 100 is indicated by reference $O_2$.

Note, each of the first and second photographing positions $M_1$ and $M_2$ may be defined as a back principal point of a photographing optical system of the camera 100.

The target 10 comprises two bars, having an L-shaped figure. Namely, the two bars are connected in such a manner that one end of one bar and one end of the other bar are connected.

Three standard point members $P_1$, $P_2$, $P_3$ and three assistant point members are mounted on the target 10. The standard point members $P_1$, $P_2$ and $P_3$ respectively define standard points and the assistant point members respectively define assistant points, in photographed pictures.

The standard point members $P_1$, $P_2$ and $P_3$ are disposed on three apexes of a triangular shape defined by the target 10. A plane defined by the standard point members $P_1$, $P_2$ and $P_3$ is a standard plane. A distance between the standard point member $P_1$, and the standard point member $P_2$ have a predetermined length of L, which is utilized as a standard measurement length. Further, a distance between the standard point members $P_1$ and $P_3$ equals the distance between the standard point members $P_1$ and $P_2$, and an angle, defined by the side between the standard point members $P_1$, $P_2$ and the side between the standard point members $P_1$, $P_3$, is 90 degrees.

Figure 2:
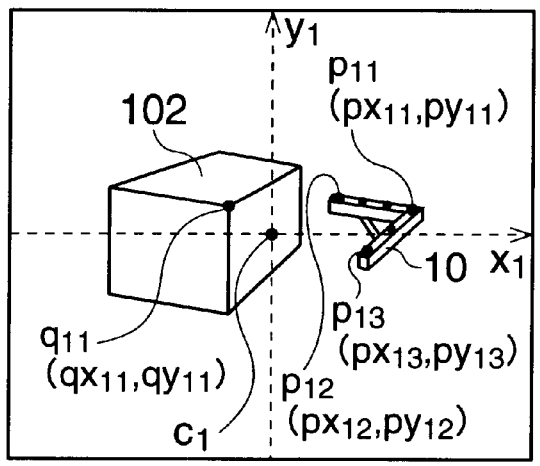
FIG. 2 is a conceptual view showing a picture photographed at a first photographing position of FIG. 1.

FIG. 2 shows a first picture photographed by the camera 100 at the first photographing position $M_1$. As is apparent from this drawing, an $x_1$-$y_1$ rectangular coordinate system is defined on the first picture, and an origin $c_1$ of the $x_1$-$y_1$ coordinate system is at the photographed center of the first picture. In this coordinate system, the standard point members $P_1$, $P_2$ and $P_3$ are represented by coordinates $p_{11}(px_{11}, py_{11})$, $p_{12}(px_{12}, py_{12})$ and $p_{13}(px_{13}, py_{13})$, respectively.

Figure 3:
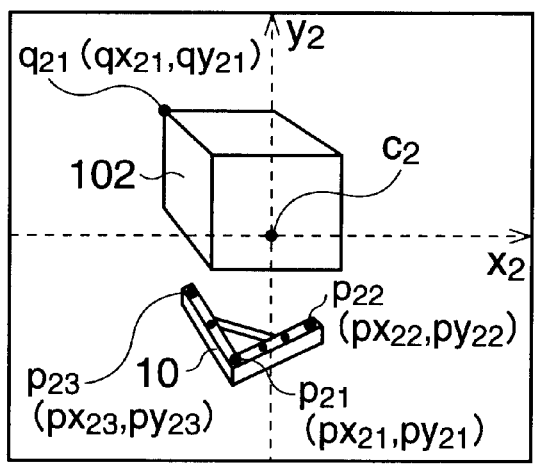
FIG. 3 is a conceptual view showing a picture photographed at a second photographing position of FIG. 1.

FIG. 3 shows a second picture photographed by the camera 100 at the second photographing position $M_2$. As is apparent from this drawing, an $x_2$-$y_2$ rectangular coordinate system is defined on the second picture, and an origin $c_2$ of the $x_2$-$y_2$ coordinate system is at the photographed center of the second picture. In this coordinate system, the standard point members $P_1$, $P_2$ and $P_3$ are represented by coordinates $p_{21}(px_{21}, py_{21})$, $p_{22}(px_{22}, py_{22})$ and $p_{23}(px_{23}, py_{23})$, respectively.

As shown in FIGS. 2 and 3, each coordinate of the standard point members $P_1$, $P_2$ and $P_3$ is represented by pij ($px_{ij}$, $py_{ij}$). A variable "i" indicates a number of the picture. Namely, when "i" is set to "1", it indicates the first picture FIG. 2, and when "i" is set to "2", it indicates the second picture FIG. 3. Further, a variable "j" indicates a number of the standard point member. In this embodiment, the variable "j" can vary between 1, 2 and 3.

Figure 4:
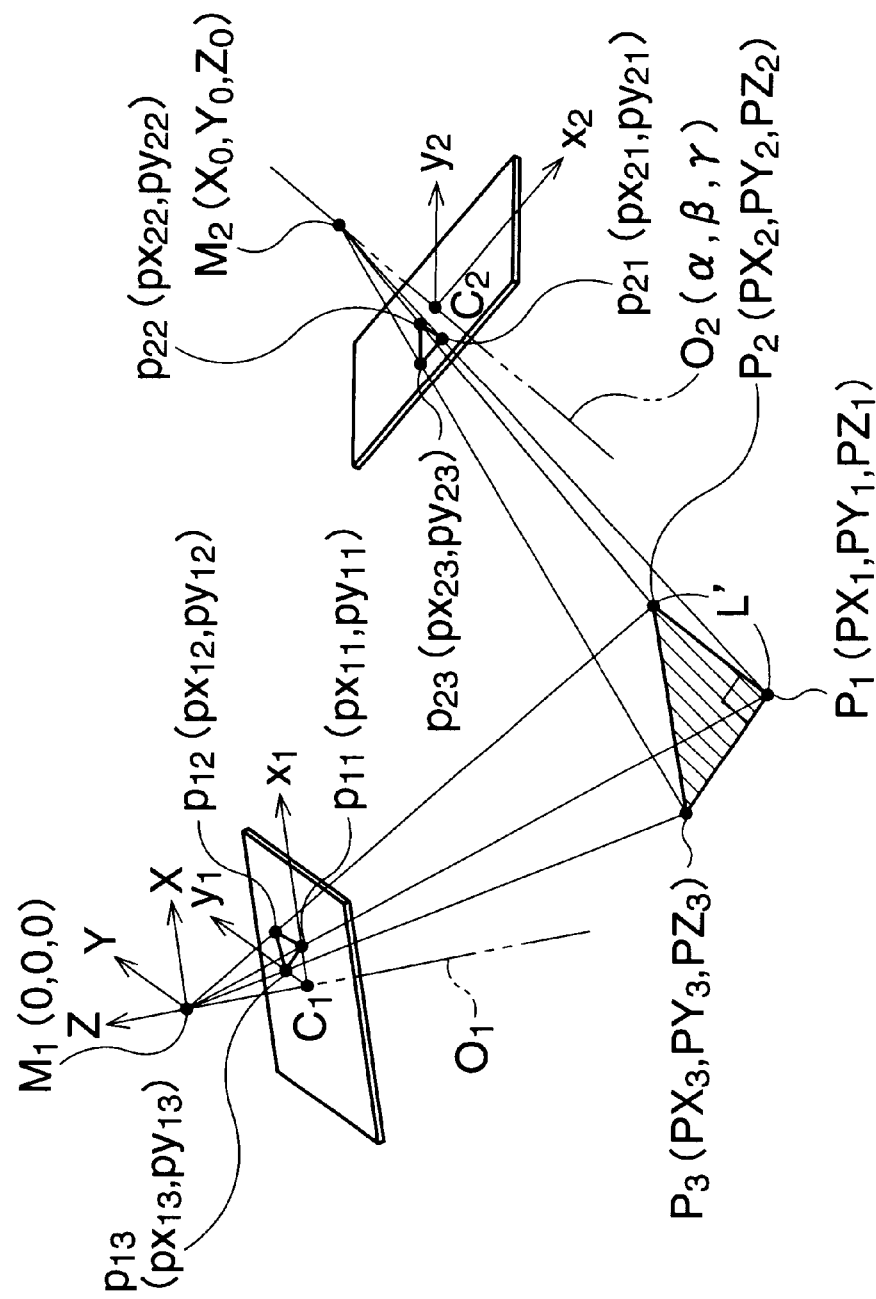
FIG. 4 is a conceptual view showing a relative-positional relationship between the standard scale and the first and second pictures from FIGS. 2 and 3, respectively.

FIG. 4 shows a relative-positional three-dimensional relationship between the target 10, the camera 100, the first and second pictures. In this case, the target 10 is relatively reproduced on the basis of the first and second pictures placed at the first and second photographing positions $M_1$ and $M_2$, but a size of the target 10 is also relative. Thus, the side defined by the standard point members $P_1$ and $P_2$ is indicated by L'. Further, the standard plane defined by the standard point members $P_1$, $P_2$ and $P_3$ is indicated as a hatched area in the drawing.

In order to calculate the three-dimensional coordinates of the cubic object 102, it is necessary to define an X-Y-Z three-dimensional coordinate system, as shown in FIG. 4, and the standard point members $P_1$, $P_2$ and $P_3$ of the target 10, recorded on each of the first and second pictures, must be positionally determined with respect to this three-dimensional coordinate system. The X-Y-Z three-dimensional coordinate system is a right-handed coordinate system.

As shown in FIG. 4, an origin of the X-Y-Z three-dimensional coordinate system is at the first photographing position $M_1$. Namely, the first photographing position $M_1$ is represented by the origin coordinates (0, 0, 0) of the X-Y-Z three-dimensional coordinate system. Also, a Z-axis of the X-Y-Z three-dimensional coordinate system coincides with the optical axis $O_1$ of the camera 100, placed at the first photographing position $M_1$, represented by angular coordinates (0, 0, 0).

The second photographing position $M_2$ is represented by coordinates ($X_0$, $Y_0$, $Z_0$). The coordinates ($X_0$, $Y_0$, $Z_0$) indicates an amount of change from the first photographing position $M_1$ to the second photographing position $M_2$. The optical axis $O_2$ of the camera 100, placed at the second photographing position $M_2$, is represented by angular coordinates ($\alpha, \beta, \gamma$). Namely, the optical axis $O_2$ of the camera 100 defines angles of $\alpha, \beta$ and $\gamma$ with the X-axis, Y-axis and Z-axis of the X-Y-Z three-dimensional coordinate system, respectively.

The standard point members $P_1$, $P_2$ and $P_3$ of the target 10 are represented by three-dimensional coordinates $P_j(PX_j, PY_j, PZ_j)$ (j=1, 2, 3). As shown in FIG. 4, each of the standard point members [$P_1(PX_1, PY_1, PZ_1)$, $P_2(PX_2, PY_2, PZ_2)$ and $P_3(PX_3, PY_3, PZ_3)$], the image point [$p_{11}(px_{11}, py_{11})$, $p_{12}(px_{12}, py_{12})$, $p_{13}(px_{13}, py_{13})$] of the corresponding reference point recorded on the first picture, and the back principal point ($M_1$) of the camera 100, are aligned with each other on a straight axis. Similarly, each of the reference points [$P_1(PX_1, PY_1, PZ_1)$, $P_2(PX_2, PY_2, PZ_2)$ and $P_3(PX_3, PY_3, PZ_3)$], the image point [$p_{21}(px_{21}, py_{21})$, $p_{22}(px_{22}, py_{22})$, $p_{23}(px_{23}, py_{23})$] of the corresponding reference point recorded on the second picture, and the back principal point ($M_2$) of the camera 100, are aligned with each other on a straight axis.

Accordingly, the three-dimensional coordinates $P_j(PX_j, PY_j, PZ_j)$ can be determined by the following collinear equations:

$$PX_j = (PZ_j - Z_o)\frac{a11pxij + a21pyij - a31C}{a13pxij + a23pyij - a33C} + Xo \quad (1)$$
$$PY_j = (PZ_j - ZO)\frac{a12pxij + a22pyij - a32C}{a13pxij + a23pyij - a33C} + Yo$$
$$(i = 1, 2; j = 1, 2, 3)$$

Herein $a11 = \cos \beta \cdot \sin \gamma$ $a12 = -\cos \beta \cdot \sin \gamma$ $a13 = \sin \beta$ $a21 = \cos \alpha \cdot \sin \gamma + \sin \alpha \cdot \sin \beta \cdot \cos \gamma$ $a22 = \cos \alpha \cdot \cos \beta - \sin \alpha \cdot \sin \beta \cdot \sin \gamma$ $a23 = -\sin \alpha \cdot \cos \beta$ $a31 = \sin \alpha \cdot \sin \gamma + \cos \alpha \cdot \sin \beta \cdot \cos \gamma$ $a32 = \sin \alpha \cdot \cos \gamma + \cos \alpha \cdot \sin \beta \cdot \sin \gamma$ $a33 = \cos \alpha \cdot \cos \beta$ Note that, in these equations, C indicates a principal focal length of the camera 100, which is defined as a distance between the back principal point ($M_1$) and the photographing center ($c_1$) of the first picture, and a distance between the back principal point ($M_2$) and the photographing center ($c_2$) of the second picture.

Figure 5:
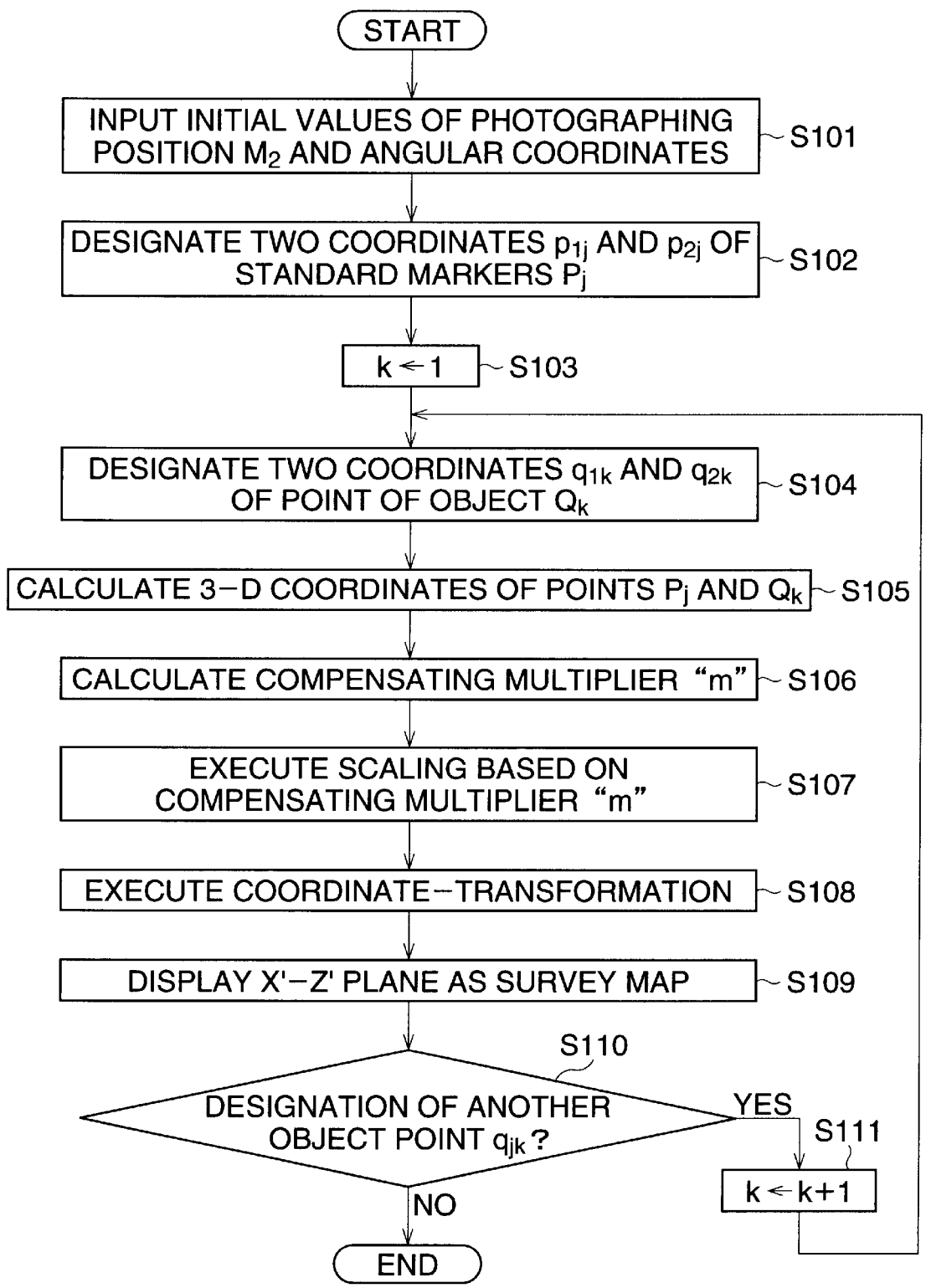
FIG. 5 is a flowchart showing a procedure of a routine for making a photogrammetric map based on the pictures of FIGS. 2 and 3.

FIG. 5 shows a flowchart of a photogrammetric measurement routine, executed in a computer, in which a survey map is developed based upon the first and second pictures, shown in FIGS. 2 and 3. In executing the routine, a set of frame numbers, corresponding to the first and second pictures, is selected by an operator. On a screen of a monitor connected to the computer, the first and second pictures are displayed.

In step S101, as three-dimensional coordinate data ($X_0$, $Y_0$, $Z_0$) of the second photographing position $M_2$, suitable initial values (except for zero) are inputted to the computer via an input device, for example, keyboard. Similarly, as the angular coordinates ($\alpha\beta\gamma$), suitable initial values (except for zero) are inputted to the computer.

In step S102, the respective reference points $p_{ij}(px_{ij}, py_{ij})$ are successively designated, on the first and second pictures displayed on the monitor, with a cursor manipulated by a mouse. Namely, the two sets of coordinates $p_{11}(px_{ij}, py_{ij})$ and $p_{21}(px_{21}, py_{21})$, the two sets of coordinates $p_{12}(px_{11}, py_{12})$ and $p_{22}(px_{22}, py_{22})$, and the two sets of coordinates $p_{13}(px_{13}, py_{13})$ and $p_{23}(px_{23}, py_{23})$ are also temporarily stored in a memory of the computer.

After the designation of the points $p_{ij}(px_{ij}, py_{ij})$, at step S102, the control proceeds to step S103, in which a counter k is set to "1". Then, in step S104, a suitable point $Q_{1(k=1)}$ of the cubic object 102 is selected (FIG. 1), and image points $q_{ik}$ (FIGS. 2 and 3) of the selected point $Q_1$ displayed on the first and second pictures of the monitor, are designated with the cursor, manipulated by the mouse. Namely, the two sets of coordinates $q_{11}(qx_{11}, qy_{11})$ and $q_{21}(qx_{21}, qy_{21})$ of the image point $Q_1$ are temporarily stored in the memory of the computer.

The positional relationship between the suitable point $Q_{1(k=1)}$, the image points $q_{ik}$, and the first and the second photographing positions $M_1$, $M_2$ is similar to the positional relationship between the standard point member $P_j$, the reference points $P_{ij}$, on the first and the second pictures and the first and the second photographing positions $M_1$, $M_2$. Namely, the suitable point $Q_{1(k=)}$, the image points $q_{ik}$, and the first and the second photographing positions $M_1$, $M_2$ are positioned on a straight line. Accordingly, the three-dimensional coordinates $Q_j(QX_j, QY_j, QZ_j)$ can be determined by the aforementioned collinear equations.

In step S105, the above-mentioned collinear equations are solved on the basis of the coordinate data stored in the memory, so that the three-dimensional coordinates $P_j(PX_j, PY_j, PZ_j)$ of the standard point members $P_1$, $P_2$ and $P_3$, the three-dimensional coordinates $Q_1(QX_1, QY_1, QZ_1)$ of the object point $Q_1$, the three-dimensional coordinate data $(X_0, Y_0, Z_0)$ and the angular coordinates $(\alpha,\beta,\gamma)$ are approximately estimated. Note that, in accordance with repeating the approximation calculation based on the collinear equations, the coordinate data $(X_0, Y_0, Z_0)$ and the angular coordinates $(\alpha,\beta,\gamma)$ are sufficiently approximated.

Namely, the three-dimensional coordinates $P_j(PX_j, PY_j, PZ_j)$ of the standard point members $P_j$ are calculated based on the two-dimensional coordinates $p_{1j}(px_{1j}, py_{1j})$ on the first picture and the two-dimensional coordinates $p_{2j}(px_{2j}, py_{2j})$ on the second picture. Also, the three-dimensional coordinates $Q_1,(QX_1, QY_1, QZ_1,)$ of the object point $Q_1$ are calculated based on the two-dimensional coordinates $q_{1k}$ $(qx_{1k}, qy_{1k})$ of the object point $Q_1$ on the first picture and the two-dimensional coordinates $q_{2k}(qx_{2k}, qy_{2k})$ of the object point $Q_1$ on the second picture. Consequently, the three-dimensional coordinate data $(X_0, Y_0, Z_0)$ and the angular coordinates $(\alpha,\beta,\gamma)$ are approximately estimated.

In step S106, a compensating multiplier m is calculated. The compensating multiplier is utilized for compensating a relative length on the three-dimensional coordinate to obtain a practical length thereof. The compensating multiplier m is calculated as follows:

$$m = L/L'$$

Note, as shown FIG. 1, L is the practical length between the standard point members $P_1$, $P_2$ and $P_3$, and L' is the relative length obtained from the determined three-dimensional coordinates $P_j(PX_j, PY_j, PZ_j)$. Namely, the relationship between the practical length L and relative length L' can be indicated by the following equality:

$$L = L' \times m \qquad \text{(m: compensating multiplier)}$$

In step S107, scaling is executed, using the compensating multiplier m, between the determined three-dimensional coordinates $P_j(PX_j, PY_j, PZ_j)$ and $Q_1(QX_1, QY_1, QZ_1)$ so as to obtain an accurate spatial relationship therebetween.

Figure 6:
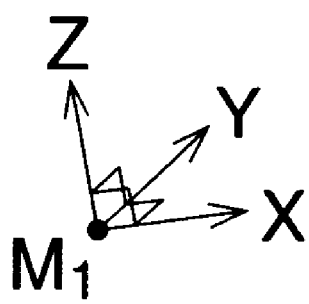
FIG. 6 is a conceptual view showing a three-dimensional coordinate based on a plane on which the standard scale lie.
Figure 6:
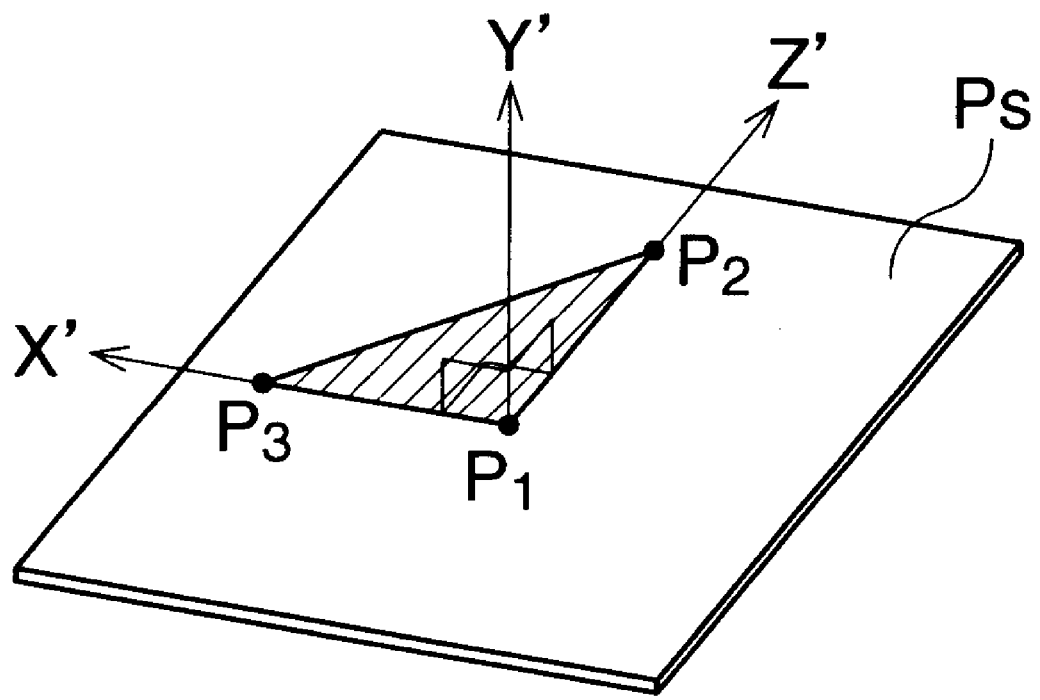

Then, in step S108, the X-Y-Z three-dimensional coordinate, system is transformed into an X'-Y'-Z' three-dimensional coordinate system defined as shown in FIG. 6. As is apparent from FIG. 6, an origin of the X'-Y'-Z' three-dimensional coordinate system is at the standard point member $P_1$, and the X'-axis thereof is defined by a straight line connecting the standard point members $P_1$ and $P_2$. Also, the X'- and Z'-axes of the coordinate system define a plane Ps, which includes the hatched triangular plane area or reference area defined by the reference points $P_1$, $P_2$ and $P_3$. In the example of FIG. 6, although the origin of the X'-Y'-Z' three-dimensional coordinate system coincides with the reference point $P_1$, the origin may be at any location included in the plane Ps.

In step S109, the X'-Z' plane Ps, on which the reference points $P_1$, $P_2$ and $P_3$ and the object points $Q_1$ and $Q_2$ are recorded, is displayed as a survey map on the monitor. Note that, the X'-Y' plane or the Y'-Z' plane may be displayed as a survey map. Further, a stereoscopic perspective view, based on the X'-Y'-Z' three-dimensional coordinate system, may be displayed as a survey map.

Then, in step S110, it is determined whether or not another set of points $q_{1k}$ and $q_{2k}$ should be designated with respect to the cubic object 102. When another set of points $q_{1k}$ and $q_{2k}$ should be further designated, the process proceeds to step S111, in which the counter k is incremented by 1. Then, the process returns to step S104. In step S104, a suitable point $Q_{2(k=2)}$ of the cubic object 102 is selected, and the two sets of coordinates $q_{12}(qx_{12}, qy_{12})$ and $q_{22}(qx_{22}, qy_{22})$ of the image point $Q_2$ are temporarily stored in the memory of the computer.

In step S105, the above-mentioned collinear equations are solved on the basis of the coordinate data, i.e. the two-dimensional coordinates $p_{1j}(px_{1j}, py_{1j})$ $p_{2j}(px_{2j}, py_{2j})$, and the two-dimensional coordinates $q_{1k}(qx_{1k}, qy_{1k})$, $q_{2k}(qx_{2k}, qy_{2k})$, stored in the memory. Accordingly, the three-dimensional coordinates $P_j(PX_j, PY_j, PZ_j)$ of the standard point members $P_1$, $P_2$ and $P_3$, the three-dimensional coordinates $Q_k(QX_k, QY_k, QZ_k)$ of the object points $Q_1$ and $Q_2$, the three-dimensional coordinate data $(X_0, Y_0, Z_0)$ and the angular coordinates $(\alpha,\beta,\gamma)$ are approximately estimated. Note that, in accordance with repeating the approximation calculation based on the collinear equations, the coordinate data $(X_0, Y_0, Z_0)$ and the angular coordinates $(\alpha,\beta,\gamma)$ are sufficiently approximated.

Namely, as a number of suitable point of the cubic object 102 increases, the three-dimensional coordinate data $(X_0, Y_0, Z_0)$ and the angular coordinates $(\alpha,\beta,\gamma)$ are more accurately estimated. Note that, at least five sets of two-dimensional coordinate data, including the two-dimensional coordinate data of the standard point members $P_1$, $P_2$, $P_3$, are required in the above-mentioned approximation calculation.

Figure 7:
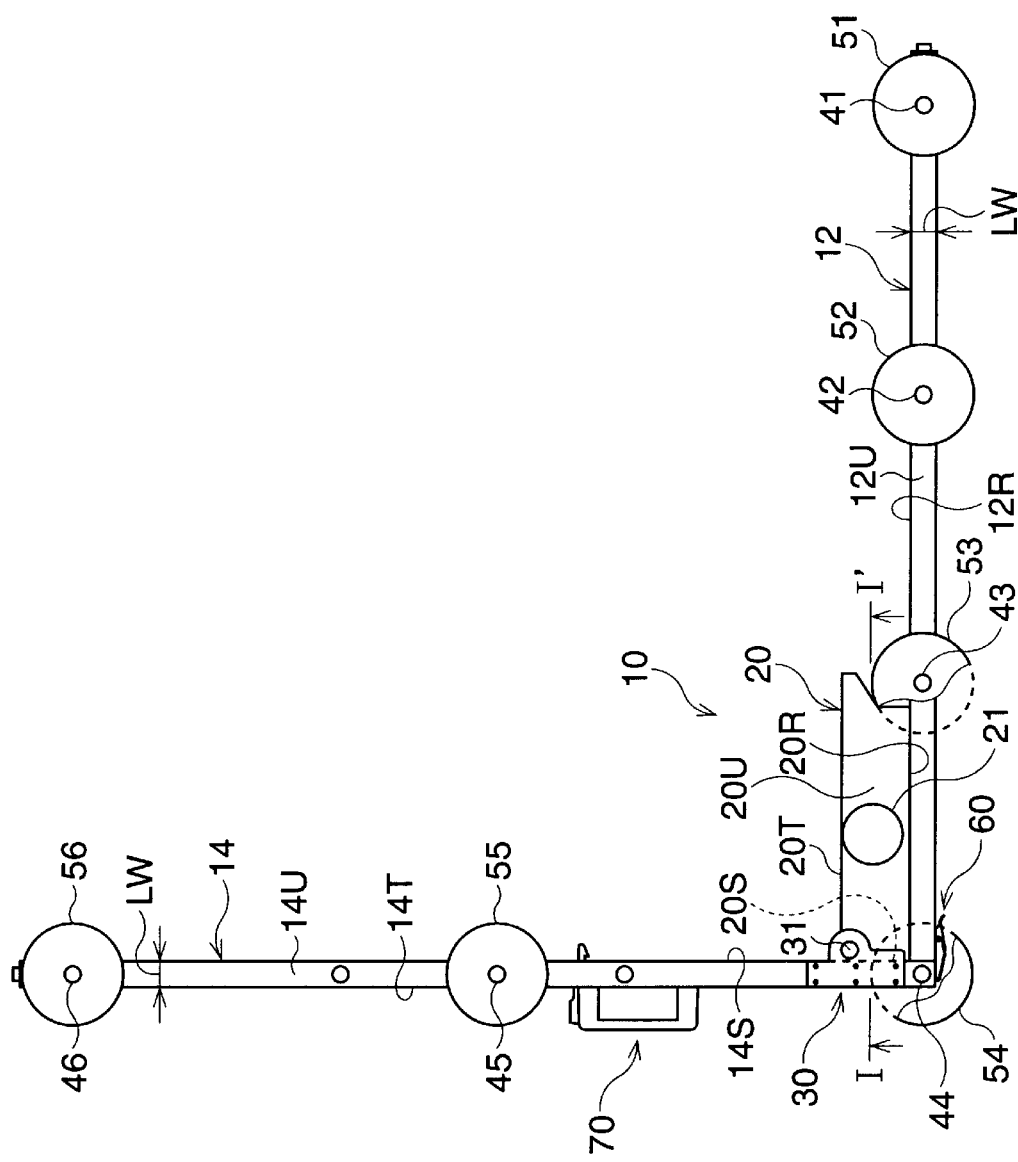
FIG. 7 is a plane view of the target, to which a first embodiment, according to the present invention, is applied.

FIG. 7 is a plan view of the target 10, to which a first embodiment, according to the present invention, is applied. FIG. 7 shows the target 10 which is in an operational position utilized in a photogrammetric spot, with portions cutaway for clarity. The target 10 includes a first bar 12 and a second bar 14. As is apparent from FIG. 7, the target 10 has the L-shaped figure in the operational position. The first and second bars 12, 14 are made of metal material. The first and second bars 12, 14 respectively have a quadratic prism shape, which is hollow. A non-reflecting sheet is attached to the whole outer surface of each of the first and second bars 12, 14. The width of each of the first and second bars 12, 14 has a length $L_W$.

A control unit box 20, which has a parallelepiped shape, is made of metal material. The non-reflecting sheet is attached on the whole outer surface of the control unit box 20. A side surface 20R of the control unit box 20 is attached to a side surface 12R of the first bar 12 such that the control unit box 20 is fixed to the first bar 12. A side surface 20S of the controlling box 20 is linked to the side surface 20R, being perpendicular to the side surface 20R. When the target 10 is in the operational position, the side surface 20S is in contact with a side surface 14S of the second bar 14, at a portion close to one end of the bar 14.

A side surface 20T of the control unit box 20 is parallel to the side surface 20R. At a portion close to a corner of the control unit box 20, at which the side surface 20S and the side surface 20T intersect at right angles, the second bar 14 is rotatively mounted on the control unit box 20, by a hinge unit 30. The second bar 14 can be rotated around an axis perpendicular to a top surface 20U of the control unit box 20.

Then hinge unit 30 includes a rotating member 31. The longitudinal direction of the rotating member 31 is perpendicular to the top surface 12U of the first bar 12 and the top surface 14U of the second bar 14. Further, the rotating member 31 is positioned between both ends of the second bar 14, being close to one of the ends.

Batteries and sensors, for example a tilt sensor, an azimuth sensor and so on, are mounted in the control unit box 20. Further, an antenna mount unit 21 is positioned on the top surface 20U of the control unit box 20. A loop antenna, which transmits signals from the above-mentioned sensors to a camera, is mounted in the antenna mount unit 21. Note that, the detail of the control unit box 20 and the antenna mount unit 21 will be explained below.

As shown in FIG. 7, on the top surface of the target 10, namely, on the top surfaces 12U, 14U of the bars 12 and 14, three standard point members 41, 44 and 46, and three assistant point members 42, 43 and 45 are mounted. The standard point member 41 and the assistant point members 42, 43 are situated on the top surface 12U of the first bar 12. The standard point members 44, 46 and the assistant point member 45 are situated on the top surface 14U of the second bar 14. At the top surface 14U, the standard point member 44 is positioned between a portion close to the rotating member 31 and the end of the second bar 14, which is close to the first bar 12. Each of the standard point members 41, 44, 46 and the assistant point members 42, 43, 45 is a circular plate, the diameters of which are identical, and smaller than the width $L_W$ of the first and second bars 12, 14.

A reflecting sheet is attached on the standard point members 41, 44, 46 and the assistant point members 42, 43, 45. The standard point members 41, 44, 46 and the assistant point members 42, 43, 45 are respectively surrounded by non-reflecting members 51, 54, 56, 52, 53 and 55. The non-reflecting members are black-colored circular plates.

When the target 10 is in the operational position at the photogrammetry spot, as shown in FIG. 7, the assistant point members 42 and 43 are positioned in such a manner that centers of the assistant point members 42 and 43 lie on a first straight line, parallel to an axis of the first bar 12, which connects a center of the standard point member 41 and a center of the standard point member 44. Also, the assistant point member 45 is positioned in such a manner that a center of the assistant point member 45 lies on a second straight line parallel to an axis of the second bar 14, which connects a center of the standard point member 44 and a center of the standard point member 46. Namely, two assistant point members (42 and 43) exist on the first straight line defined by the standard point members 41 and 44, and one assistant point member (45) exists on the second straight line defined by the standard point members 44 and 46.

A distance between the standard point member 41 and the assistant point member 42, a distance between the assistant point members 42 and 43, a distance between the assistant point member 43 and the standard point member 44, are identical. Also, a distance between the standard point member 44 and the assistant point member 45, and a distance between the assistant point member 45 and the standard point member 46, are identical.

A standard plane of the photogrammetric analytical measurement is defined by the standard point members 41, 44, 46 and the assistant point members 42, 43, 45, and standard measurement lengths are defined by the sides of an isosceles triangle whose apices are the standard point members 41, 44, 45. Namely, a length of the straight line connecting the standard point members 41 and 44, a length of the straight line connecting the standard point members 44 and 46, and a length of the straight line connecting the standard point members 46 and 41, are predetermined. The length of these straight lines are utilized as the standard measurement lengths for the photogrammetric analytical measurement.

The operational position of FIG. 7 is fixed by a lock unit 60. Further, a grip mechanism 70 is provided on the side surface 14T of the second bar 14. The grip mechanism 70 is positioned between the standard point member 44 and the assistant point member 45. When the second bar 14 is released from the lock unit 60, the second bar 14 becomes rotatable. Accordingly, the target 10 can be folded in such a manner that the first and second bars 12, 14 are parallel. A user is able to carry the folded target 10 readily, by holding the grip mechanism 70.

Figure 8:
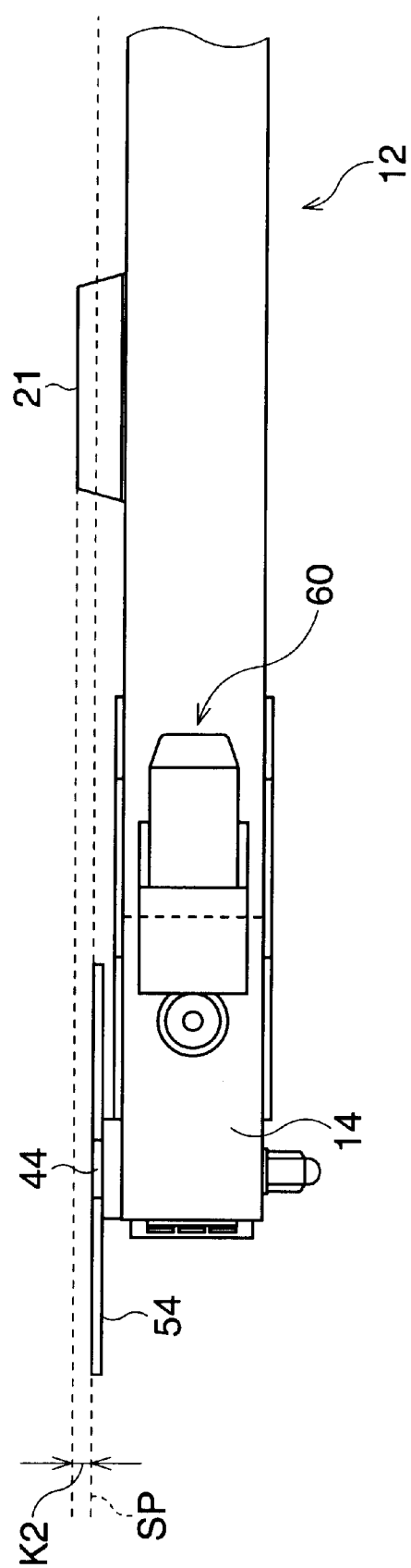
FIG. 8 is an enlarged side view of the target, viewed from a side of a first bar.
Figure 9:
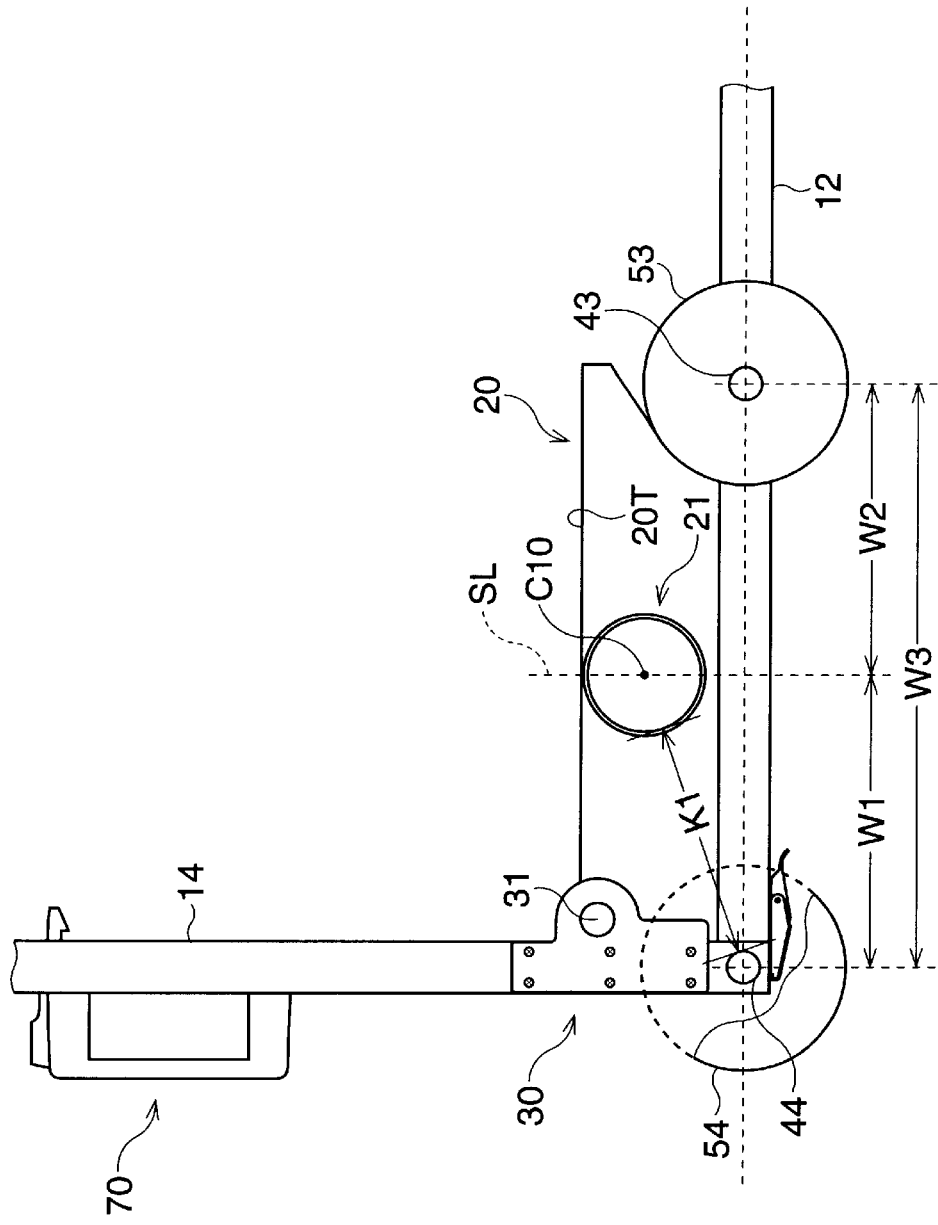
FIG. 9 is an enlarged plane view of a control unit box and other components around the control unit box.

FIG. 8 is an enlarged side view of a portion of the target 10, at which the control unit box 20 is positioned. The portion is depicted from the side of the side surface parallel to the side surface 12R. FIG. 9 is an enlarged plan view of the portion at which the control unit box 20 is positioned. A plane SP of FIG. 8 is the standard plane defined by the standard point member 44, the other standard point members 41, 46 (see FIG. 7) and the assistant point members 42, 43, 45 (see FIG. 7). K1 (see FIG. 9) is a length of a straight line which connects the standard point member 44 and the antenna mount unit 21, being parallel to the plane SP. K2 (see FIG. 8) is a distance perpendicular to the plane SP between the plane SP and the top surface of the antenna mount unit 21. The antenna mount unit 21 is positioned such that the relationship between K1 and K2 can be indicated by the following inequality:

$$K2/K1 < \tan 8° \qquad (2)$$

Note that, as is apparent from FIG. 9, the distance K1 coincides with a distance obtained by projecting a straight line on the standard plane SP, which connects a point on the outer periphery of the top surface of the antenna mount unit 21, which is closest to the standard point member 44, and a point on the outer periphery of the standard point member 44, which is closest to the antenna mount unit 21.

Further, as shown in FIG. 9, the standard point member 44 is positioned close to the end of the second bar 14 which is close to a portion connected with the first bar 12. The assistant point member 43 is positioned at a portion on the first bar 12, adjacent to the standard point member 44, when the target 10 is in the operational position. The standard point member 44 and the assistant point member 43 are respectively positioned close to the ends of the control unit box 20 in the longitudinal direction of the first bar 12.

The positional relationship between the standard point member 44, the assistant point member 43 and the antenna mount unit 21 will be explained. Note that, straight lines and points utilized in the following explanation lie on a same plane parallel to the standard plane SP.

A first straight line connects the assistant point member 43 and the standard point member 44. A second straight line is perpendicular to an axis C10 of the antenna mount unit 21 and the first straight line. W1 is a distance from the standard point member 44 to an intersection point of the first and second straight lines. W2 is a distance from the intersection point to the assistant point member 43. The distance W1 and the distance W2 are identical. Namely, the second straight line is a bisector SL of a distance W3 between the standard point member 44 and the assistant point member 43, and the axis C10 intersects with the bisector SL. Further, on the bisector SL, the axis C10 exists close to the side surface 20T which is the side furthest from the first bar 12.

The above-mentioned positioning of the antenna mount unit 21 produces the following effect. Namely, when the camera is positioned at height of approximately 1.4 meters from the surface on which the target 10 is situated and at a distance of approximately 10 meters from the standard point member 44, the antenna mount unit 21 does not obstruct the standard point member 44 and a useful photograph is always taken.

Usually, in the photogrammetric analytical measurement, the photographing of the photogrammetry spot is not carried out at a position lower than 1.4 meters from the surface on which the target 10 is situated, or at a position further than 10 meters from the target 10. Accordingly, by positioning the antenna mount unit 21 on the control unit box 20 such that the aforementioned inequality is satisfied and the axis C10 exists on the bisector SL, obstruction of the standard point member 44 by the antenna mount unit 21 is avoided at almost all positions of photographing in the photogrammetric analytical measurement.

Figure 10:
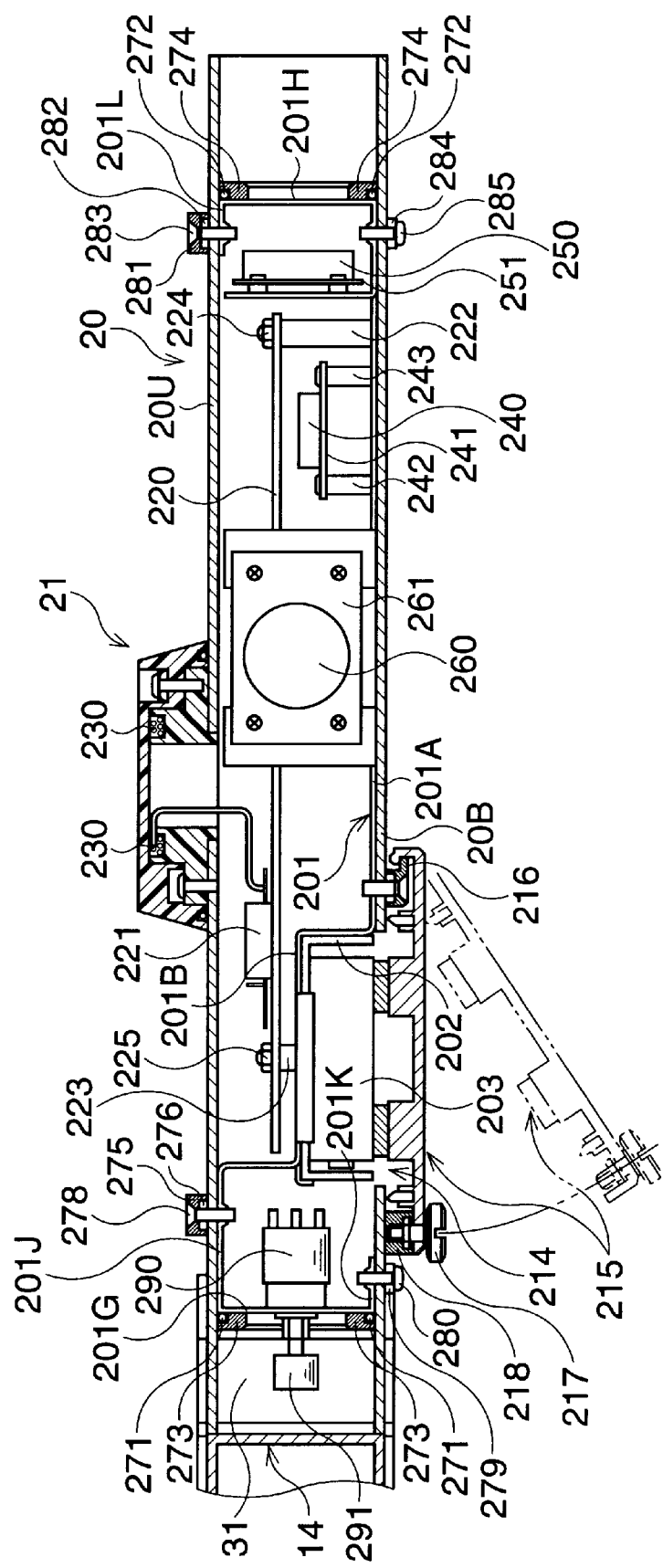
FIG. 10 is a view of the control unit box, partially in cross-section along a longitudinal direction thereof.

FIG. 10 is an enlarged sectional view taken in the direction of the arrows substantially along the line I-I' of FIG. 7. A frame 201 is provided in the control unit box 20 for placing a control board and sensors (described below) at appropriate positions. The frame 201 is produced by blanking a sheet to a predetermined shape and folding some portions of the shaped sheet. A base 201A of the frame 201 is in contact with the inner surface of a bottom 20B of the control unit box 20.

Figure 11:
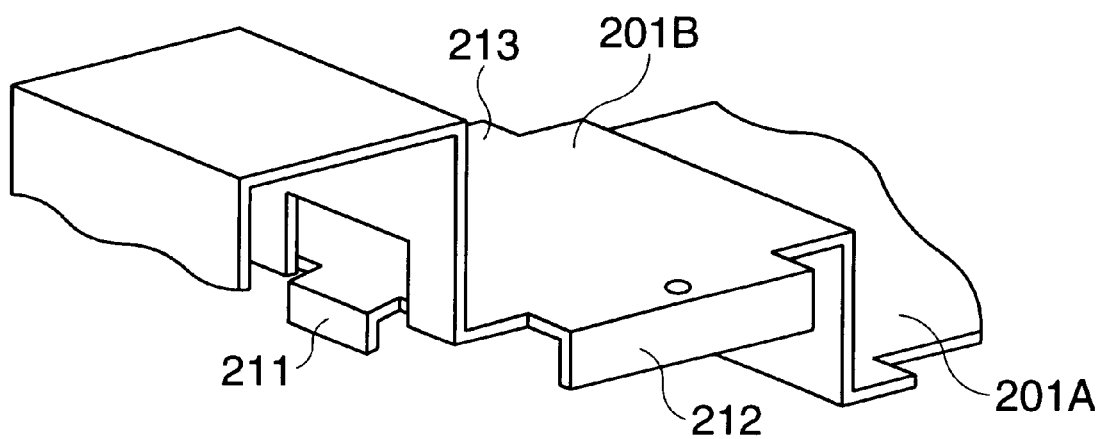
FIG. 11 a perspective view of a portion of a frame provided in the control unit box, in which a battery holder is provided.

A plurality of batteries 203 are held by a battery holder 202. In the battery holder 202, the batteries are arranged along a direction perpendicular to the sheet of FIG. 10. Only one of the batteries 203 is depicted in FIG. 10. The batteries supply electrical power to the electronic components (described below). As shown in FIG. 11, the frame 201 is folded at the boundary of the base 201A and a holding plane 201B, so that the holding plane 201B is positioned at a predetermined height in the control unit box 20. Further, the holding plane 201B includes three portions 211, 212 and 213 which are turned up. The battery holder 202 is fixed on the holding plane 201B by screws (omitted in FIG. 11), being held between the turned up portions 211, 212 and 213.

An opening portion 214 is formed at the bottom 20B of the control unit box 20, corresponding to the battery holder 202. One end of a battery cover 215 is hooked to a battery cover supporting member 216. The battery cover 215 can be rotated around the battery cover supporting member 216 to which the end of the battery cover 215 is hooked. A mounting screw 217 is provided at another end of the battery cover 215. The battery cover 215 is fixed to the control unit box 20 by engaging the mounting screw 217 with a battery cover mounting member 218, covering the opening portion 214.

Some control circuit components are provided on the control board 220, and an oscillator 221, the frequency of which is 310 MHz (mega hertz), is provided on the control board 220. A collar 222 is provided on the base 201A of the frame 201, and a collar 223 is provided on the holding plane 201B. The control unit board 220 is fixed to the collars 222 and 223 by mounting screws 224 and 225, so that the control unit board 220 is positioned at a predetermined height. A loop antenna 230 is connected to the oscillator 221.

An azimuth sensor 240, for detecting an azimuth of the target 10, is provided on a sensor board 241. The sensor board 241 is fixed by collars 242 and 243 which are provided on the base 201A of the frame 201, being positioned below the control board 220.

A tilt sensor 250 detects a tilt angle of the target 10 around an axis parallel to the longitudinal direction of the first bar 12 (see FIG. 7). A tilt sensor 260 detects a tilt angle of the target 10 around an axis parallel to the longitudinal direction of the second bar 14 (see FIG. 7). The tilt sensors 250 and 260 are respectively provided on sensor boards 251 and 261.

Figure 12:
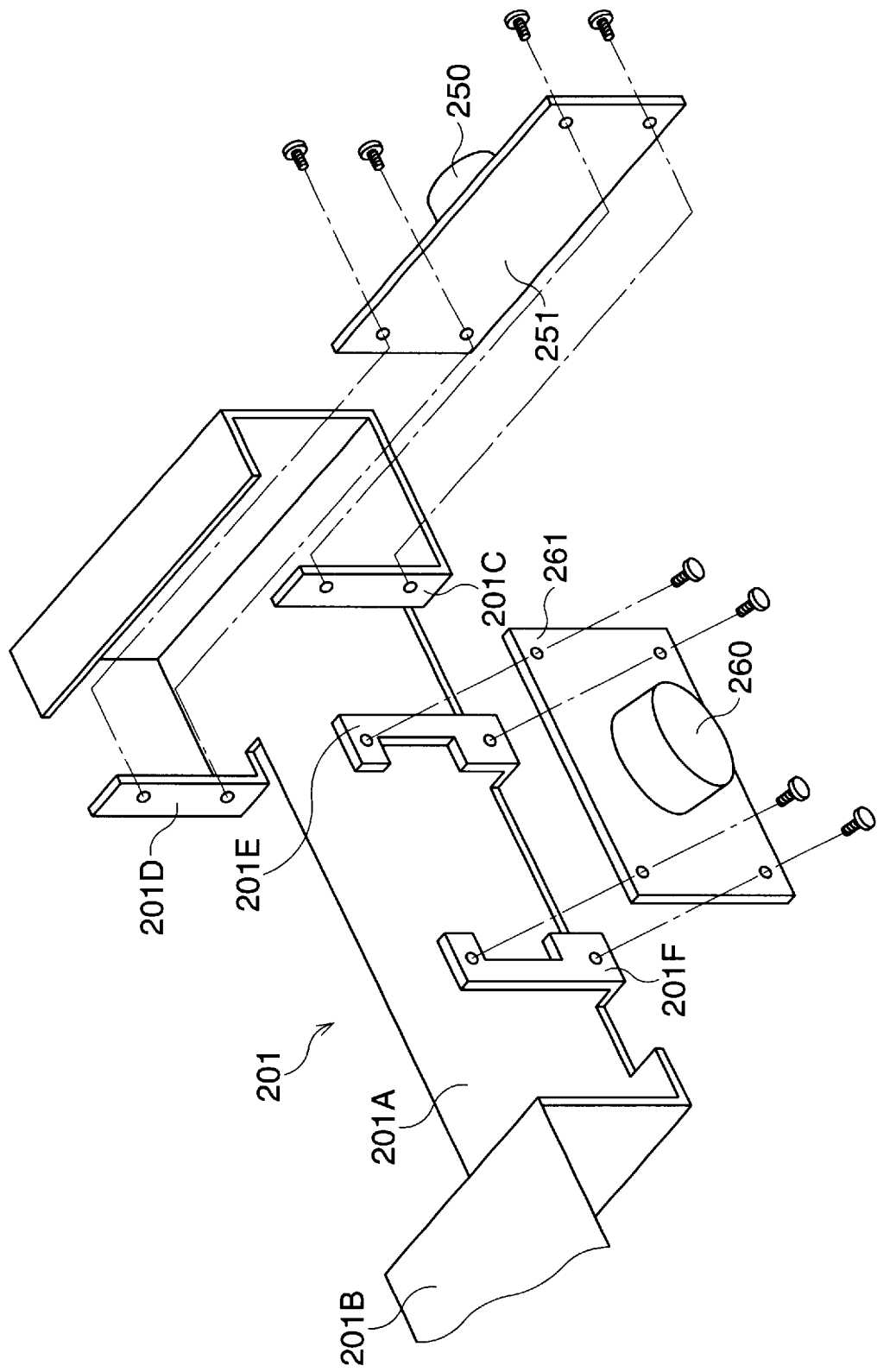
FIG. 12 is a perspective view of a portion of the frame, in which tilt sensors are provided.

As shown in FIG. 12, turned-up-portions 201C and 201D are folded perpendicular to the base 201A. The sensor board 251 is fixed on the turned-up-portions 201C and 201D by screws. Further, turned-up-portions 201E and 201F are folded perpendicular to the base 201A. The sensor board 261 is fixed on the turned-up-portions 201E and 201F by screws.

An end of the control unit box 20, at the side of the second bar 14, and another end of the control unit box 20, at the side of the assistant point member 43 (see FIG. 7), are respectively open. The open portion at the side of the second bar 14 is covered by a covering portion 201G which is folded perpendicular to the base 201A. Similarly, the open portion at the side of the assistant point member 43 is covered by a covering portion 201H which is folded perpendicular to the base 201A. Seal sheets 273 and 274 are respectively attached to the covering portions 201G, 201H with O rings 271 and 272. Accordingly, dust and water are prevented from entering the inside of the control unit box 20 from either end of the control unit box 20.

A mounting portion 201J of the frame 201 connects the holding plane 201B and the covering portion 201G. The mounting portion 201J is fixed to the control unit box 20 by a screw 278 through a rib 275 and a water proof packing 276. Also, the covering portion 201G includes a mounting portion 201K which is folded toward the inside of the control unit box 20. The mounting portion 201K is fixed to the control unit box 20 by a screw 280 through a water proof packing 279.

The covering portion 201H includes a mounting portion 201L which is folded toward the inside of the control unit box 20. The mounting portion 201L is in contact with the inner surface of the top 20U of the control unit box 20. The mounting portion 201L is fixed to the control unit box 20 by a screw 283, through a rib 281, and a water proof packing 282. Further, a portion of the base 201A, which corresponds to the mounting portion 201L, is fixed to the control unit box 20 by a screw 285 through a water proof packing 284.

A power switch 290 and a switch button 291 are provided on the covering portion 201G. The power switch 290 is placed at the inner side of the covering portion 201G, and the switch button 291 is placed at the outer side of the covering portion 201G. When the switch button 291 is pressed, the power switch 290 is turned ON, so that the batteries 203 start supplying electric power to the control board 220, the azimuth sensor 240, the tilt sensors 250, 260 and so on.

Figure 13:
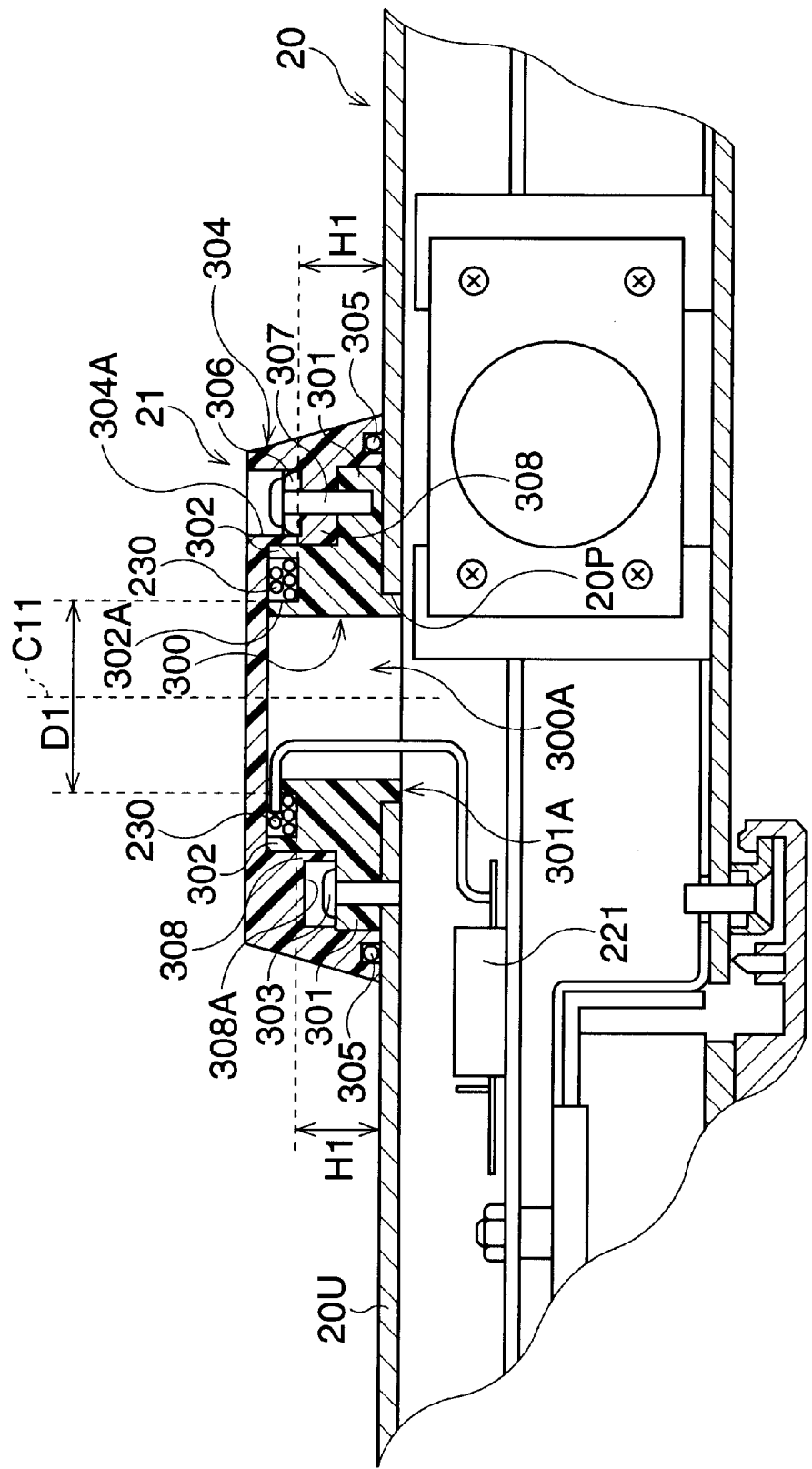
FIG. 13 is an enlarged sectional view of an antenna mount unit and other components around the antenna mount unit, of the target of the first embodiment.

FIG. 13 is an enlarged view of the antenna mount unit 21 and the surrounding components. An antenna holder 300 of the antenna mount unit 21 is made of resin, with a generally cylindrical configuration, including a large diameter portion 301 and a small diameter portion 302. The small diameter portion 302 is unitarily and coaxially formed with the large diameter portion 301. The large diameter portion 301 is fixed on the top surface 20U of the control unit box 20 by a screw 303. A piercing hole 300A is formed inside the antenna holder 300. A projecting portion 301A, which is ring-shaped, is formed at an opening of the piercing hole 300A at the large diameter portion 301. The outer diameter of the projecting portion 301 A coincides with the diameter of an opening portion 20P which is formed at the top surface 20U.

A slot 302A, which is ring-shaped, is formed close to an opening of the piercing hole 300A at the small diameter portion 302. The slot 302A is coaxial with the small diameter portion 302. In the slot 302A, a conductor (i.e. a wire) is looped to construct the loop antenna 230. Therefore, in the first embodiment, a central axis C11 of the loop antenna 230 coincides with the central axes of the opening portion 20P and the antenna holder 300. In other words, the central axis C10 (see FIG. 12) of the antenna mount unit 21 and the central axis C11 of the loop antenna 230 are coaxial with each other.

As described above, the loop antenna 230 is connected to the oscillator 221, the frequency of which is 310 MHz (mega hertz). Accordingly, a wavelength of a radio wave which is sent from the loop antenna 230 is determined by the following formula (3).

$$\lambda = C/V \tag{3}$$

herein, $\lambda$: wavelength( unit: m(meter)

C: speed of radio wave unit: m/s(meter/second)

V: frequency( unit: Hz(hertz) )

The speed of the radio wave is $3 \times 10^8$ m/s. Accordingly, the wavelength $\lambda$ sent from the loop antenna 230 equals approximately 0.96 meters. A total length of the loop antenna 230 is set to approximately 0.48 m, which is half the wavelength $\lambda$ of the sent radio wave such that the loop antenna 230 is resonated.

Referring to a table shown in FIG. 14, results of an experiment which evaluated the performance of loop antennae will be explained. In the experiment, parameters of several loop antennae, i. e., diameter of loop, total length and conductor coil height, are set to various values, and predetermined data is sent to an external device from the loop antennae. As shown in the table of FIG. 14, the results obtained by the experiment are indicated as communication distances for which data transmission is possible by each of the loop antennae. Note that, the conductor coil height is a distance between the conductor winding and the top surface 20U of the control unit box 20, along a direction perpendicular to the top surface 20U.

When the total length of the conductor (i.e. the wire) is set to approximately 0.48 meters (0.47 through 0.50 meters) and the conductor coil height is set to 8.0 through 9.5 mm (millimeters), the communication distance tends to be shorter as the diameter of loop becomes larger (see item 4, 7, 9, 15 and 18 ). For example, as shown at item 4, when the loop diameter is set to 25 mm, the total length is set to 0.48 m, and the conductor coil height is set to 9.5 mm, the loop antenna has a communication distance of 8.5 meters through 10.0 meters. On the other hand, as shown at item 18, when the loop diameter is set to 50 mm, the total length is set to 0.47 m, and the conductor coil height is set to 8.0 mm, the loop antenna has a communication distance of 5.0 meters.

Further, when the diameter of loop is set to 40 mm and the total length is set to 0.47 m, the communication distance tends to be longer as the conductor coil height becomes larger (see item 14 through 16 ). For example, as shown at item 14, when the diameter of loop is set to 40 mm, the total length is set to 0.47 meters and the conductor coil height is set to 4.0 mm, the loop antenna has a communication distance of 2.5 meters through 3.5 meters. On the other hand, as shown at item 16, under similar condition to the item 14 with respect to the diameter of loop and the total length, when the conductor coil height is set to 10.0 mm, the antenna has a communication distance of 5.0 through 6.0 meters.

As described above, as the diameter of loop becomes smaller and as the conductor coil height becomes larger, the communication distance tends to be longer. In the photogrammetric analytical measurement, it is empirically known that image data suitable to the operation of the photogrammetric analytical measurement can be obtained, when the photographing is carried out within an approximately 5 through 10 meters radius from the target placed at the photogrammetry spot. Accordingly, from the result of the aforementioned experiment, if the diameter of the loop is set to approximately 25 through 50 mm and the conductor coil height is set to approximately 8.0 through 9.5 mm, the performance of the loop antenna is satisfactory when photographing is carried out at the photogrammetry spot.

Based on the result of the aforementioned experiment, in the first embodiment, the slot 302A is formed such that a height H1 (see FIG. 13) of the loop antenna 230, from the top surface 20U of the control unit box 20, is approximately 9.5 mmand the inner diameter D1 (see FIG. 13) is approximately 25 mm. Note that, as the aforementioned wavelength $\lambda$ is approximately 0.96 m, the inner diameter D1 of the wound conductor, which is approximately 25 mm, is approximately one-fortieth of the wavelength $\lambda$.

As shown in FIG. 13, an antenna cover 304 is made of resin, being a shaped plate. The antenna cover 304 is situated such that an opening thereof faces the antenna holder 300. The end surface of the antenna cover 304, which is at the side of the opening, is in contact with the top surface 20U of the control unit box 20. A water proof packing 305 is provided between the end surface of the antenna cover 304 and the top surface 20U. A recess portion 304A is formed at the outer surface of the bottom of the antenna cover 304, the bottom being a side opposite to the opening. The antenna cover 304 is fixed to the antenna holder 300 by a screw 307, through a water proof packing 306, at the recess portion 300A.

A step portion 308 is formed at an inner wall of the antenna cover 304, such that the antenna cover 304 is engaged with the antenna holder 300 through the large and small diameter portions 301, 302. A recess portion 308A is formed in the step portion 308, corresponding to the screw 303. The bottom of the antenna cover 304 covers the opening of the piercing hole 300A at the side of the small diameter portion 302 and the slot 302A. Accordingly, the antenna cover 302 protects the loop antenna 230 from outside and prevents, for example, rainwater from entering the control unit box 20.

Figure 15:
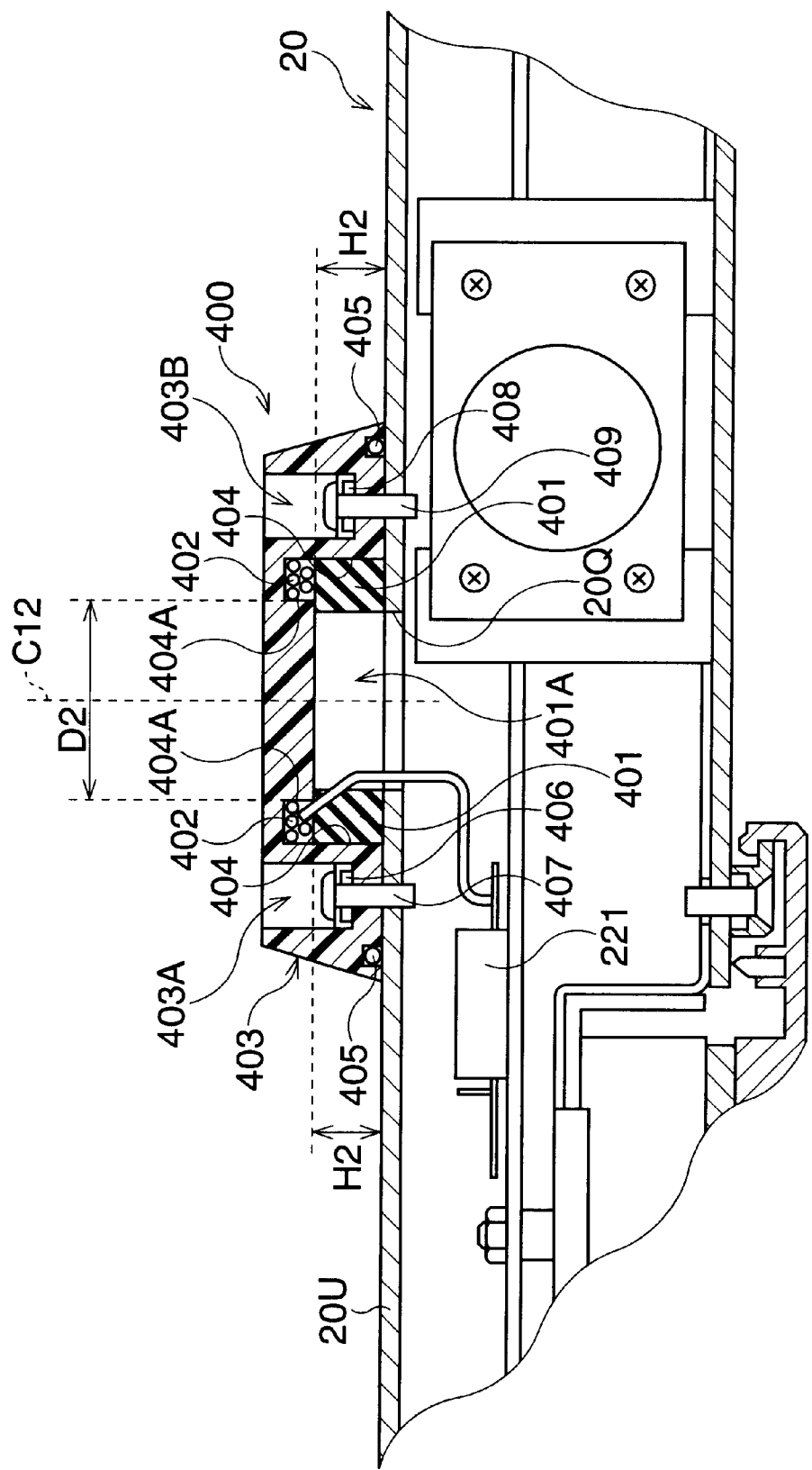
FIG. 15 is an enlarged sectional view of an antenna mount unit of the target, to which a second embodiment, according to the present invention, is applied.

FIG. 15 is an enlarged view of an antenna mount unit 400, to which a second embodiment, according to the present invention, is applied. Note that, in the second embodiment, the construction of other components, except the antenna mount unit 400, is similar to those of the target 10 of the first embodiment. The antenna mount unit 400 is positioned such that a first distance between the standard point member 44 (see FIG. 8) and the antenna mount unit 400, along the standard plane SP and a second distance between the standard plane SP and the top end of the antenna mount unit 400, along the direction perpendicular to the standard plane SP, have the relationship indicated by the aforementioned inequality (2). Note that, the first distance corresponds to the length K1, and the second distance corresponds to the length K2.

Further, on the bisector SL between the standard point member 44 and the assistant point member 43, the central axis of the antenna mount unit 400 exists close to the side surface 20T which is the furthest side from the first bar 12.

An antenna holder 401 of the antenna mount unit 400 has a cylindrical configuration, being made of rubber. The antenna holder 401 is provided on the top surface 20U of the control unit box 20. In the antenna holder 401, a piercing hole 401A is formed. The diameter of the piercing hole 401A is identical with the diameter of an opening portion 20Q which is formed at the top surface 20U. On the top end of the antenna holder 401, a conductor is looped along an arc of the top end to construct a loop antenna 402.

An antenna cover 403 has a plate configuration, being made of resin. In the antenna cover 403, a hole 404, which is engaged with the antenna holder 401, is formed. A bottom end of the antenna cover 403 is in contact with the top surface 20U of the control unit box 20, and a water proof packing 405 is provided between the bottom end and the top surface 20U. A ring-shaped slot 404A is formed at a base of the hole 404. The above-mentioned loop antenna 402 is provided in the slot 404A.

Further, recess portions 403A and 403B are formed at the top surface of the antenna cover 403. The antenna cover 403 is fixed to the control unit box 20 by a screw 407, through a water proof packing 406, at the recess portion 403A and by a screw 409, through a water proof packing 408, at the recess portion 403B.

With respect to the loop antenna 402, the central axis C12 of the wound conductor coincides with the central axis of the antenna holder 401. Similar to the first embodiment, the loop antenna 402 is connected to the oscillator 221, the frequency of which is 310 MHz. In accordance with the frequency of the oscillator 221, the total length of the conductor of the loop antenna 402 is set to approximately 0.48 m, half the wavelength of the radio wave sent from the loop antenna 402.

Further, the antenna holder 401 is situated such that a height H2 of the loop antenna 402 from the top surface 20U of the control unit box 20, is approximately 9.5 mm. The ring-shaped slot 404A is formed such that the inner diameter D2 of the loop antenna 402 is approximately 25 mm.

Figure 16:
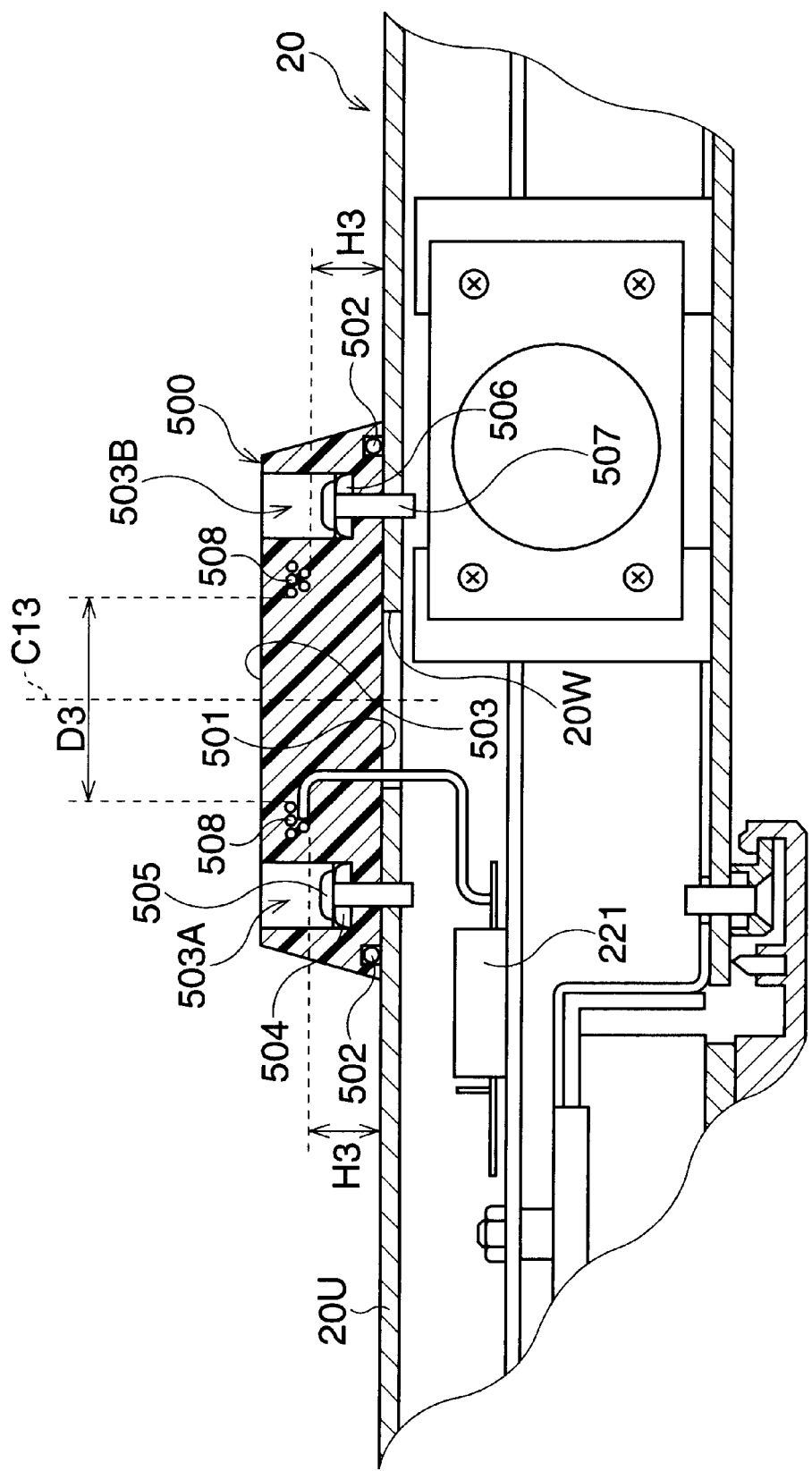
FIG. 16 is an enlarged sectional view of an antenna mount unit of the target, to which a third embodiment, according to the present invention, is applied.

FIG. 16 is an enlarged view of an antenna mount unit 500, to which a third embodiment, according to the present invention, is applied. Note that, in the third embodiment, the construction of other components, except the antenna mount unit 500, is similar to those of the target 10 of the first embodiment.

The antenna mount unit 500 has a generally disk shaped configuration, and is made of resin. A sectional shape of the antenna mount unit 500 is a trapezoid. The bottom surface 501 of the antenna mount unit 500 is in contact with the top surface 20U of the control unit box 20. An O ring 502 is provided between the antenna mount unit 500 and the top surface 20U.

Further, recess portions 503A and 503B are formed at the top surface 503 of the antenna mount unit 500. The antenna mount unit 500 is fixed to the control unit box 20 by a screw 505 which is provided on a base of the recess portion 503A, through a water proof packing 504, and by a screw 507 which is provided on a base of the recess portion 503B through a water proof packing 506.

The antenna mount unit 500 is positioned such that a first distance between the standard point member 44 (see FIG. 8) and the antenna mount unit 500, along the standard plane SP and a second distance between the standard plane SP and the top end of the antenna mount unit 500, along the direction perpendicular to the standard plane SP, have the relationship indicated by the aforementioned inequality (2). Note that, the first distance corresponds to the length K1 and the second distance corresponds to the length K2.

Further, similar to the first and second embodiment, on the bisector SL between the standard point member 44 and the assistant point member 43, the central axis of the antenna mount unit 500 exists close to the side surface 20T which is the furthest side from the first bar 12.

A loop antenna 508 is molded at a portion close to the top surface 503 of the antenna mount unit 500. The loop antenna 500 is produced by winding a conductor around a central axis C13. The loop antenna 500 is connected to the oscillator 221 through an opening 20W which is formed at the control unit box 20. The central axis C13 of the loop antenna 508 coincides with the central axis of the antenna mount unit 500.

As described above, the frequency of the oscillator 221 is 310 MHz. In accordance with the frequency, the total length of the conductor of the loop antenna 508 is approximately 0.48 m, an approximately half the wavelength of the radio wave sent from the loop antenna 508. Further, the loop antenna 508 is molded in the antenna mount unit 500 such that: the inner diameter D3 is approximately 25 mm, and a height H3 of the loop antenna 508 from the top surface 20U of the control unit box 20 is approximately 9.5 mm, when the antenna mount unit 500 is fixed on the top surface 20U.

As described above, according to the present invention, in the photogrammetric analytical measurement system, a target from which data is reliably transmitted to a camera without obstructing indicating members, can be obtained.

The present disclosure relates to subject matter contained in Japanese Patent Application No.P2000-154006 (filed on May 25, 2000) which is expressly incorporated herein, by reference, in its entirety.

What is claimed is:

1. A target for photogrammetric analytical measurement system comprising:

a first bar and a second bar which are connected at adjacent end portions;

indicating members that are able to be recognized in a photographed image by a camera, being placed on said first and second bars so as to define an identical plane;

a box in which sensors for detecting data utilized to calculate a photographing position of said camera, being provided on said first bar or said second bar at a position close to said connecting end portions;

a loop antenna that transmits said data detected by said sensors to an outer device; and a projecting portion in which said loop antenna is provided, being placed on said box at a side at which said indicating members are placed on said first and second bars, wherein, a relationship between a first distance K1 and a second distance K2 are defined by an expression to follow, said first distance K1 being along said identical plane between a first indicating member of said indicating members which is positioned close to said connecting end portions and said projecting portion, and said second distance K2 being along a direction perpendicular to said identical plane between a top surface of said projecting portion and said identical plane $$K2/K1 < \tan 8°.$$

2. The target of claim 1, wherein a total length of a conductor which is wound to construct said loop antenna is approximately half a wavelength of a radio wave sent from said loop antenna, an inner diameter of winding of said conductor is within a range between approximately 25 mm (millimeter) through 50 mm, and a distance, along said perpendicular direction, between said identical plane and said loop antenna is greater than or equal to approximately 8 mm.

3. The target of claim 1, wherein said projecting portion has a generally cylindrical configuration which is coaxial with a center axis of said loop antenna, said center axis existing on a bisector of said first indicating member and a second indicating member of said indicating members, which is placed on said first or second bar at which said box is provided, being adjacent to said first indicating member.

4. The target of claim 1, wherein said projecting portion comprises: a holding member that holds said loop antenna, being fixed on said top surface of said box; and a covering member that protects said loop antenna from outer side.

5. The target of claim 1, wherein said projecting portion is fixed on said top surface of said box, being made of resin, and said loop antenna is molded in said projecting portion.

6. The target of claim 1, wherein said box is positioned at an area of a right angle or an acute angle made by said first and second bars.

7. A target for a photogrammetric analytical measurement system comprising:

a first bar and a second bar which are connected at adjacent end portions;

indicating members that are able to be recognized in a photographed image by a camera, being placed on said first and second bars so as to define an identical plane;

means for equipping sensors for detecting data utilized to calculate a photographing position of said camera, being provided on said first bar or said second bar at a position close to said connecting end portions;

means for transmitting said data detected by said sensors to an outer device; and means for mounting said transmitting means, being placed on said equipping means at a side at which said indicating members are placed on said first and second bars, wherein, a relationship between a first distance K1 and a second distance K2 are defined by an expression to follow, said first distance K1 being along said identical plane between a first indicating member of said indicating members which is positioned close to said connecting end portion and said mounting means, and said second distance K2 being along a direction perpendicular to said identical plane between a top surface of said mounting means and said identical plane $K2/K1 < \tan 8°$.

* * * * *